United States Patent
Gabriel et al.

(10) Patent No.: US 10,596,984 B2
(45) Date of Patent: Mar. 24, 2020

(54) TUNED RESONANCE HV INTERLOCK

(71) Applicant: Ford Global Technologies, LLC, Dearborn, MI (US)

(72) Inventors: David Crist Gabriel, Troy, MI (US); Benjamin A. Tabatowski-Bush, South Lyon, MI (US); Karin Lovett, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 156 days.

(21) Appl. No.: 15/292,176

(22) Filed: Oct. 13, 2016

(65) Prior Publication Data

US 2018/0105125 A1    Apr. 19, 2018

(51) Int. Cl.
*B60R 16/023* (2006.01)
*B60L 3/04* (2006.01)

(52) U.S. Cl.
CPC ............ *B60R 16/0232* (2013.01); *B60L 3/04* (2013.01); *B60Y 2200/91* (2013.01); *B60Y 2200/92* (2013.01)

(58) Field of Classification Search
CPC ... B60R 16/0232; B60L 3/04; B60Y 2200/92; B60Y 2200/91
See application file for complete search history.

(56) References Cited

U.S. PATENT DOCUMENTS

| | | | | |
|---|---|---|---|---|
| 4,417,207 A | * | 11/1983 | Sato | G01R 31/021 307/108 |
| 4,739,185 A | * | 4/1988 | Lee | F02P 9/007 123/605 |
| 5,117,323 A | * | 5/1992 | Asplund | H02H 3/17 361/42 |
| 5,477,089 A | * | 12/1995 | Porter | H03H 7/40 307/10.1 |
| 8,334,670 B2 | | 12/2012 | Meyer, III | |
| 9,087,418 B2 | | 7/2015 | Luedtke et al. | |
| 9,132,733 B2 | * | 9/2015 | Tago | B60L 3/0069 |
| 9,150,108 B2 | | 10/2015 | Wang et al. | |
| 2002/0012210 A1 | * | 1/2002 | Morris | H02H 11/008 361/23 |
| 2005/0038613 A1 | * | 2/2005 | Yamaoka | G01R 31/2812 702/58 |
| 2006/0017445 A1 | * | 1/2006 | Flock | B60R 16/023 324/503 |
| 2010/0187904 A1 | * | 7/2010 | Lucas | B60K 6/40 307/10.1 |
| 2013/0270974 A1 | * | 10/2013 | Wang | B60L 50/51 310/68 R |
| 2015/0255975 A1 | * | 9/2015 | Siciak | B60R 16/02 307/9.1 |

* cited by examiner

*Primary Examiner* — Rexford N Barnie
*Assistant Examiner* — Terrence R Willoughby
(74) *Attorney, Agent, or Firm* — David B. Kelley; Brooks Kushman P.C.

(57) ABSTRACT

A high-voltage system for a vehicle includes a module having a resonant circuit coupled across powerlines, and a controller. The controller is programmed to, during a power up of the high-voltage system, propagate on the powerlines a first signal at a fundamental frequency for a first period. The controller is further programmed to, in response to a first impedance measured across the powerlines at the fundamental frequency during the period being less than a predetermined value, close main contactors to energize the module.

14 Claims, 4 Drawing Sheets

TUNED RESONANCE HV INTERLOCK

TECHNICAL FIELD

This application is generally related to a hybrid vehicle high voltage subsystem that includes multiple high voltage components in which each component has a tuned resonance component that can be used to monitor conductivity of the subsystem.

BACKGROUND

Electrified vehicles including hybrid-electric vehicles (HEVs) and battery electric vehicles (BEVs) rely on a traction battery to provide power to a traction motor for propulsion and a power inverter therebetween to convert direct current (DC) power to alternating current (AC) power. The typical AC traction motor is a 3-phase motor that may be powered by 3 sinusoidal signals each driven with 120 degrees phase separation. The traction battery is configured to operate in a particular voltage range and provide a maximum current. The traction battery is alternatively referred to as a high-voltage battery wherein a terminal voltage of a typical traction battery is over 100 Volts DC. However, improved performance of electric machines may be achieved by operating in a different voltage range, typically at voltages greater than the traction battery terminal voltage. Likewise, the current requirements to drive a vehicular electric machine are commonly referred to as high current in which the current may exceed 600 Amps in operation. Often the impact of parasitic inductances of a switch, such as a solid state switch or a power module, used to toggle the voltage and current may result in inductive coupling between the power lead and the control lead.

Also, many electrified vehicles include a DC-DC converter, referred to as a variable voltage converter (VVC), to convert the voltage of the traction battery to an operational voltage level of the electric machine. The electric machine, that may include a traction motor, may require a high voltage and high current. Due to the voltage, current and switching requirements, a solid state switch such as an Insulated Gate Bipolar junction Transistor (IGBT) is typically used to generate the signals in the power inverter and the VVC.

SUMMARY

A high-voltage system for a vehicle includes a module having a resonant circuit coupled across powerlines, and a controller that, during a power up of the high-voltage system, propagates on the powerlines a first signal at a fundamental frequency for a first period, and in response to a first impedance measured across the powerlines at the fundamental frequency during the period being less than a predetermined value, closes main contactors to energize the module.

A controller includes an output channel configured to be coupled with powerlines and propagate a signal at a frequency on the powerlines, an input channel configured to receive a value indicative of an impedance across the powerlines measured at the frequency, and control logic programmed to upon overflow of a timer, modulate the output channel to generate the signal at a fundamental frequency for a predetermined time, and in response to the value being within a predetermined range of a reference value, generate a command to close main contactors.

A method of interlocking a high-voltage system of a vehicle includes propagating a resonant frequency, of an LC circuit in the system, on powerlines of the system during a first period, measuring an impedance across the powerlines during the first period, and in response to the impedance being within a predetermined range of a reference value, energizing the high-voltage system.

DETAILED DESCRIPTION

Figure 1:
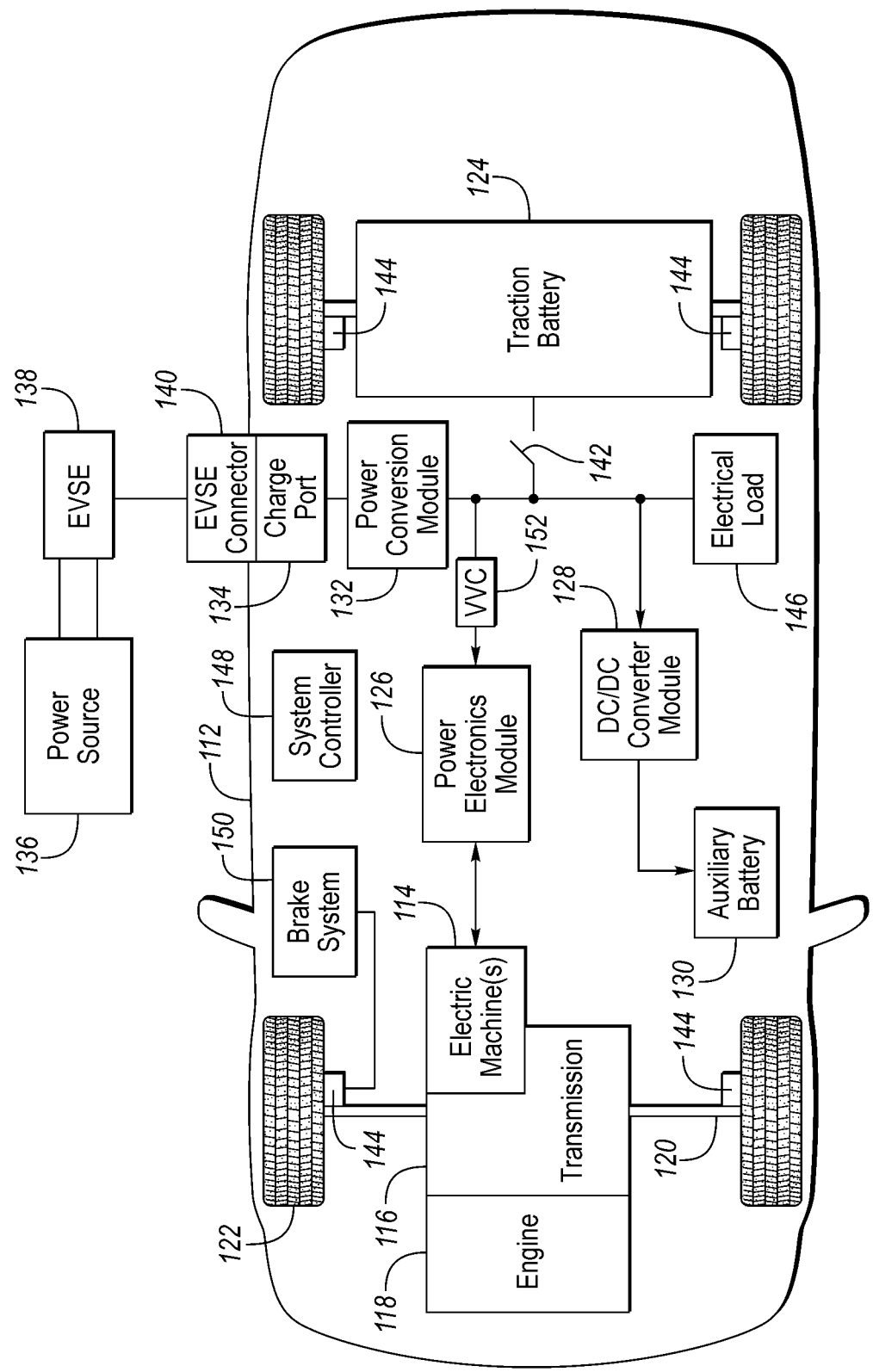
FIG. 1 is a diagram of a hybrid vehicle illustrating typical drivetrain and high-voltage systems.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A electric vehicles including battery electric vehicles (BEVs), hybrid electric vehicles (HEVs) and plug-in hybrid electric vehicles (PHEVs) typically include a high-voltage battery that is used to provide power to one or more electric components such as an electric machines used to provide propulsive force. Typically the high-voltage battery and high-voltage subsystem requires at least one high-voltage interlock (HVIL) circuit on connectors, interfaces, components, and modules. The HVIL is configured to provide a verification signal to the battery interfaces and subsystems when the interface is properly connected. The proper connection includes confirming or verifying that connectors are properly seated. For a connection to be properly seated, the connection must be coupled such that all terminals are fully engaged. Typically, connectors include main terminals and secondary terminals in which the main terminals are coupled first and after the main terminals have traveled a predetermined distance, the secondary terminals are coupled. For example, a connection may include a plug and a receptacle. The plug may include 4 flat or spade male terminals that are configured to be inserted into the receptacle that has 4 female terminals configured to accept the male terminals. The length or orientation of the male terminals with respect to the female terminals may be such that 2 main male terminals first make connection with 2 main female terminals and must be inserted a predetermined distance into the female terminals before the 2 secondary male terminals are positioned such that they can make contact with the secondary female terminals. This reduces access to a conductive part of an open interface (e.g. electrical connector) when a high-voltage is present as the high voltage may be conditional upon the secondary terminals being connected, and connection may be designed such that the secondary terminals are only connected after the main terminals are connected and there is no exposed conductive surface of the main terminals. Thus, the secondary terminals may be verified as fully closed before energizing high-voltage components or subsystems. The secondary terminals of some HVIL circuits may include a 'shorting bar' that is coupled with a connector such that a closed electrical circuit is formed when the interface is closed. This circuit typically has a supply wire running from a control module to the interface, and a separate return wire running from the interface back to the control module. The supply side wire and return side wire are connected to circuitry in the control module used to determine if the circuit is open or closed.

Here, the integrity of a high-voltage subsystem including a high-voltage (HV) Direct Current (DC) network may be monitored, detected, and controlled by at least one interconnect, configured to test for continuity of at least one connection within the network. A high-frequency AC signal is summed to the HV DC bus (e.g., power lines and main terminals) in conjunction with at least one tuned LC circuit located at each HV connection point. Multiple connection points may each use an LC circuit tuned to a different resonance frequency with a narrow bandwidth to avoiding overlap. Thus, this system may be used to determine the integrity of multiple connection points of the system individually and independently.

High voltage circuit integrity monitoring (a.k.a. HV interlock) typically is performed using a separate low-voltage jumper circuit integrated into each HV connector system. An alternative mechanism includes a mechanical HV connection cover (or other protection device) that is monitored using secondary connections, as described above, or a micro-switch (or similar device). These "piggy back" devices at the connection point are monitored by a control module or controller to indicate integrity of the associated HV connection as they are in close proximity to the HV connection. The low voltage jumper circuit can be routed from HV component to HV component in series with the continuity monitored at a single location. Also, it is possible for each HV component to monitor the status of the jumper or switch at its location locally, and broadcast the status of the connection using CAN or other communication mechanism.

Ideally a circuit monitor function would be configured with direct visibility to the circuit of interest. This may be achieved by injecting an AC signal, having a variable frequency that is swept over a range of frequencies, to the HV DC network. In another embodiment, an AC signal is injected onto the DC network at a frequency selected from a plurality of frequencies that are stored in the controller. The plurality of frequencies may include a fundamental frequency and other frequencies offset from the fundamental frequency by a coefficient. To reduce interference between the fundamental frequencies of a first module and a second module, the coefficient of the fundamental frequencies of the first and second modules may be an integer, a fraction, a decimal number, a prime number, or an odd prime number. Also, when the coefficient is a decimal number, the decimal number may be selected from an odd prime number with the decimal point shifted such that the fractional part is still an odd prime number. For example, the odd prime number of 271 with a decimal point shifted by 2 would result in 2.71 thereby having an odd prime number (71) as the fractional part. The use of odd prime numbers as the coefficients aids in selection of frequencies in which the harmonics are distinct. For example, a first module with a 1 MHz fundamental frequency may use a 2.71 coefficient for the second module such that the second module's fundamental frequency is 2.71 MHz. In another embodiment, the coefficient may be greater than 4 such that harmonics that match would be attenuated as the strength of a harmonic typically degrades as the harmonic increases. In another embodiment, the fundamental frequency and offset frequency are selected such that the first 3 fundamental frequency harmonics are distinct from a first 3 offset frequency harmonics. Further, it is possible to include a tuned series LC circuit at a remote connection point on the HV network. Thus, if the frequency of the AC signal is tuned to the resonant frequency of the LC circuit, then the continuity of the connection can be determined by monitoring the AC current in the circuit.

The frequency that causes maximum AC current may be determined by two equations:

$$\omega = \frac{1}{\sqrt{LC}} \quad (1)$$

$$f_o = \frac{1}{2\pi\sqrt{LC}} \quad (2)$$

For equation 1, L is the inductance in Henries, and C is the capacitance in farads, w is the angular frequency that is measured in radians per second. In equation 2, $f_o$ is the frequency associated with the angular frequency (i.e., angular frequency divided by $2\pi$). Extrapolating this concept to more complex HV networks, the LC circuit at each connection point may be tuned to resonate at a different frequency. Therefore, by monitoring the AC current in the network as a function of the frequency, it becomes possible to detect the connection status of each connection point uniquely.

Here, a system is disclosed that allows for direct monitoring of HV circuit without relying on a supplemental LV circuit. This system may allow for less expensive HV connectors, for example, connectors that are not required to have integrated interlock circuits. Also, this system may allow for interlock functionality when a standard vehicle bus (e.g., CAN) is faulted or if a module is faulted.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present. In other configurations, the electrified vehicle 112 may be a full hybrid-electric vehicle (FHEV) without plug-in capability.

A traction battery or battery pack 124 stores energy that can be used by the electric machines 114. The vehicle battery pack 124 may provide a high voltage direct current (DC) output. The traction battery 124 may be electrically coupled to one or more power electronics modules 126. One or more contactors 142 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) 152 electrically coupled between the traction battery 124 and the power electronics module 126. The VVC 152 may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems may be electrically coupled to the auxiliary battery 130. One or more electrical loads 146 may be coupled to the high-voltage bus. The electrical loads 146 may have an associated controller that operates and controls the electrical loads 146 when appropriate. Examples of electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components.

Figure 2A:
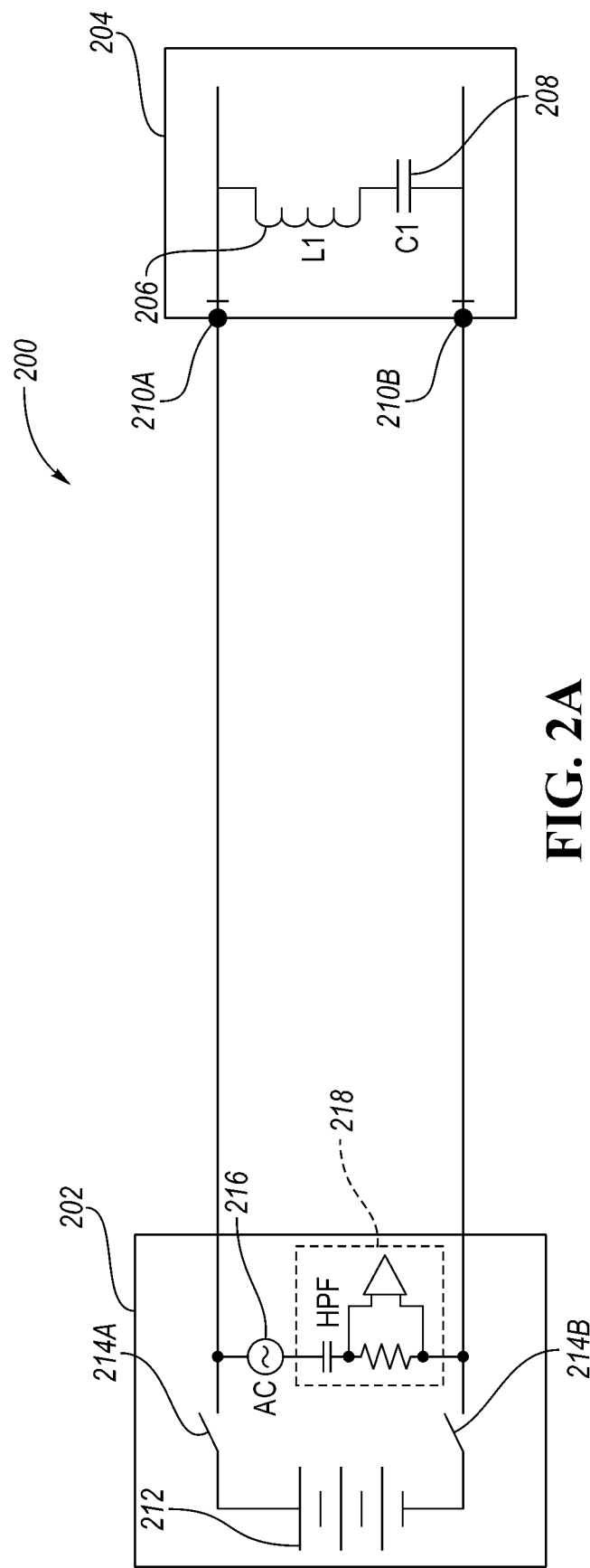
FIG. 2A is a schematic diagram of a tuned resonance high-voltage interlock for a battery system coupled with a high-voltage module.

FIG. 2A is a schematic diagram of a tuned resonance high-voltage interlock system 200 for a high-voltage battery system 202 coupled with a high-voltage module 204. The high-voltage voltage module 204 includes an inductor (L1) 206 coupled in series with a capacitor (C1) 208 to form a tuned resonant circuit. Here, the use of a series LC circuit connected in series with a load will act as a band-pass filter. This series LC circuit will have zero impedance at the resonant frequency. Therefore, when a frequency, oscillating at the resonant frequency, is applied to the high-voltage terminals 210A and 210B, the impedance across the terminals 210A and 210B will be approach zero. The high-voltage battery system 202 may include a high-voltage battery 212 selectively coupled with the high-voltage terminals 210A and 210B by a positive main contactor 214A and a negative main contactor 214B. Also, selectively coupled with the high-voltage terminals 210A and 210B, a frequency generator 216 coupled in series with an impedance measurement circuit 218 may be coupled with the high-voltage power lines of the high-voltage battery system 202. The coupling of the frequency generator 216 may be capacitive coupling or other common coupling method in which an AC signal is injected onto DC power lines.

For example, based on equations 1 and 2 from above, a series LC circuit having an inductor 206 with an inductance of 100 uH and a capacitor 208 with a capacitance of 250 pF would have a resonate fundamental frequency of 1 Mhz. Based on this 1 MHz fundamental frequency, the $2^{nd}$ harmonic would be 2 MHz, with 3 MHz being the $3^{rd}$ harmonic, 4 MHz being the $4^{th}$ harmonic, and 5 MHz being the $5^{th}$ harmonic. In another example, a series LC circuit having an inductor 206 with an inductance of 100 uH and a capacitor 208 with a capacitance of 50 pF would have a resonate fundamental frequency of 2.25 Mhz. Based on this 2.25 MHz fundamental frequency, the $2^{nd}$ harmonic would be 4.5 MHz, with 6.75 Hz being the $3^{rd}$ harmonic, 9 MHz being the $4^{th}$ harmonic, and 11.25 MHz being the $5^{th}$ harmonic. Further, a signal produced by the frequency generator that is propagated onto the power lines coupling the main positive contactor 234A with the main positive terminal 230A and the main negative contactor 234B with the main negative terminal 230B may have multiple formats. The signal may be a sinusoidal, a square wave, a triangle wave, or other common signal variant. Further, the signal may be a pulse-width modulated (PWM) signal in which a duty cycle of the PWM signal is varied. Although 1 MHz and 5 MHz examples were provided, this system is not limited to those values, other fundamental frequencies may be used including frequencies around 500 KHz, 750 KHz, 1 MHz, 5 MHz, 10 Mhz, 50 Mhz, 100 Mhz, etc.

Figure 2B:
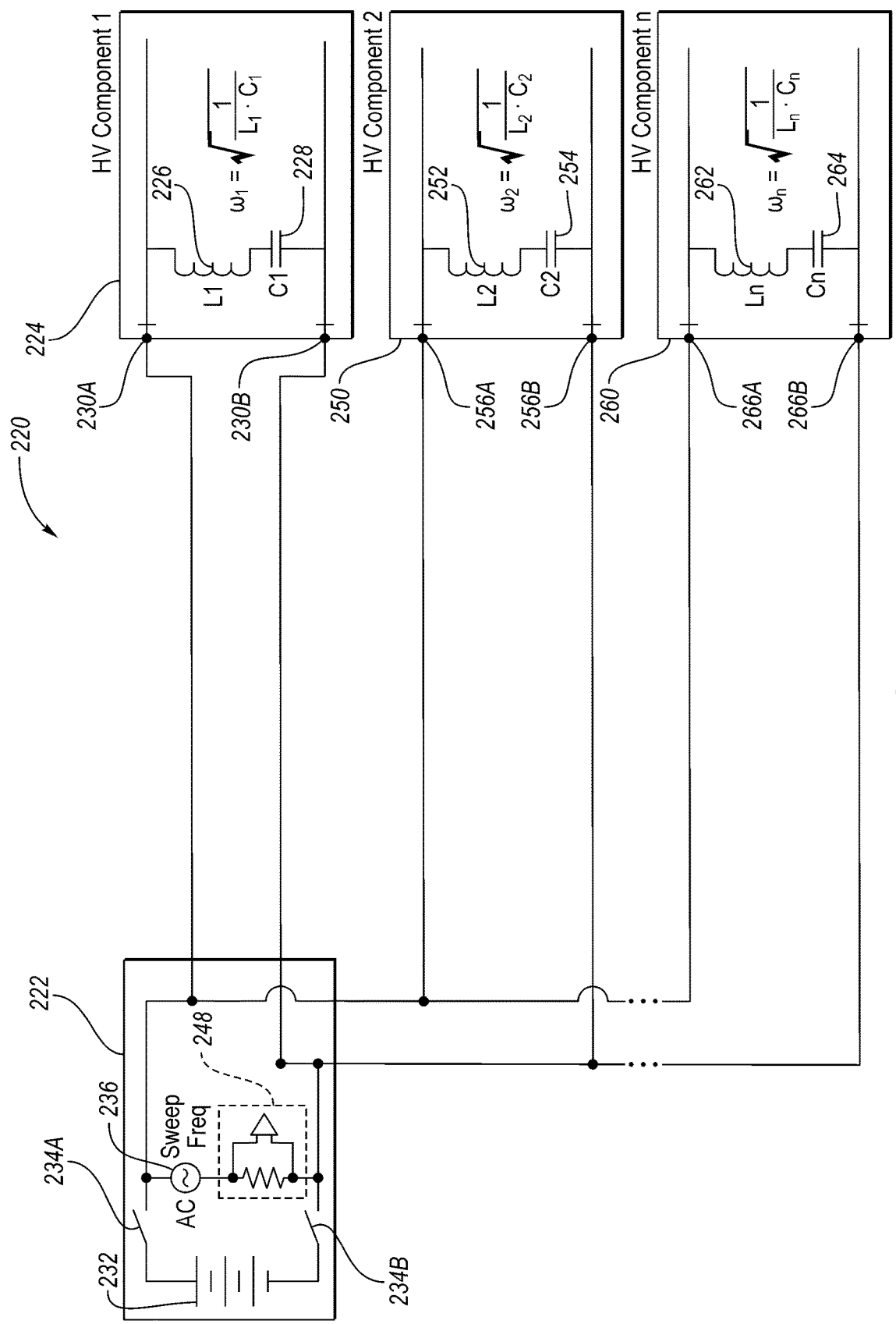
FIG. 2B is a schematic diagram of a tuned resonance high-voltage interlock for a battery system coupled with multiple high-voltage modules.

FIG. 2B is a schematic diagram of a tuned resonance high-voltage interlock system 220 for a high-voltage battery system 222 coupled with multiple high-voltage modules 224, 250, and 260. The high-voltage module 224 includes an inductor (L1) 226 coupled in series with a capacitor (C1) 228 to form a tuned resonant circuit. Here, the use of a series LC circuit connected in series with a load will act as a band-pass filter. This series LC circuit will have zero impedance at the resonant frequency. Therefore, when a frequency, oscillating at the resonant frequency, is applied to the high-voltage terminals 230A and 230B, the impedance across the terminals 230A and 230B will be approach zero. The high-voltage battery system 222 may include a high-voltage battery 232 selectively coupled with the high-voltage terminals 230A and 230B by a positive main contactor 234A and a negative main contactor 234B. Also, selectively coupled with the high-voltage terminals 230A and 230B, a frequency generator 236 coupled in series with an impedance measurement circuit 248 may be in the high-voltage battery system 222. In this example shown in parallel with the first module 224 is a second module 250 and a third module 260. The second high-voltage module 250 includes a second inductor (L2) 252 coupled in series with a second capacitor (C2) 254 to form a tuned resonant circuit that may be measured across a positive high-voltage terminal 256A and a negative high-voltage terminal 256B. Similarly, the third high-voltage module 260 includes a third inductor (L3) 262 coupled in series with a third capacitor (C3) 264 to form a tuned resonant circuit that may be measured across a positive high-voltage terminal 266A and a negative high-voltage terminal 266B. Here, the third high-voltage module 260 is represented as "n" such that the number of modules is not limited to three, but may include a system with more than three modules, such as 3, 4, 5, 6, 7, or any integer number.

Although 1 MHz and 2.25 MHz examples were provided for the illustration of FIG. 2A, these systems are not limited to those values, other fundamental frequencies may be used including frequencies ranges around 500 KHz, 750 KHz, 1 MHz, 5 MHz, 10 MHz, 50 MHz, 100 MHz, or other similar frequency. Referring back to FIG. 2B, for example, a system with 3 modules may be configured such that the 3 fundamental frequencies in which the fundamental frequencies are offset from the primary fundamental frequency, in which substantially all fundamental frequencies and harmonic frequencies are distinct. For example, a first module may be tuned with a fundamental frequency of 1 MHz, while a second module is tuned at a first offset frequency that is 2.3 times the fundamental frequency, and a third module is tuned at a third offset frequency that is 3.7 times the fundamental frequency. In this example, using a 1 MHz fundamental frequency with harmonics of 2, 3, 4, and 5, the second module would be tuned to 2.33 MHz with harmonics of 4.6, 6.9, 9.2, and 11.5, and the third module would be tuned to 3.7 MHz with harmonics of 7.4, 11.1, 14.8, and 18.5. The offset frequencies may be determined based on harmonic frequencies, electronic magnetic interference (EMI) of the vehicle, stray inductances, and susceptibility of system to propagate the frequencies, including characteristics of the power lines (e.g., length, impedance, connectors that may cause reflections, insulation from EMI). For example, a system that modulates a DC/DC converter or power inverter at a specific frequency, it may be advantageous to tune the fundamental frequency away from this frequency and the first 5 harmonics of the modulation frequency. Other considerations to consider when selecting the frequencies include compensating for additional components on HV bus (e.g., X-caps and Y-caps)

Figure 3:
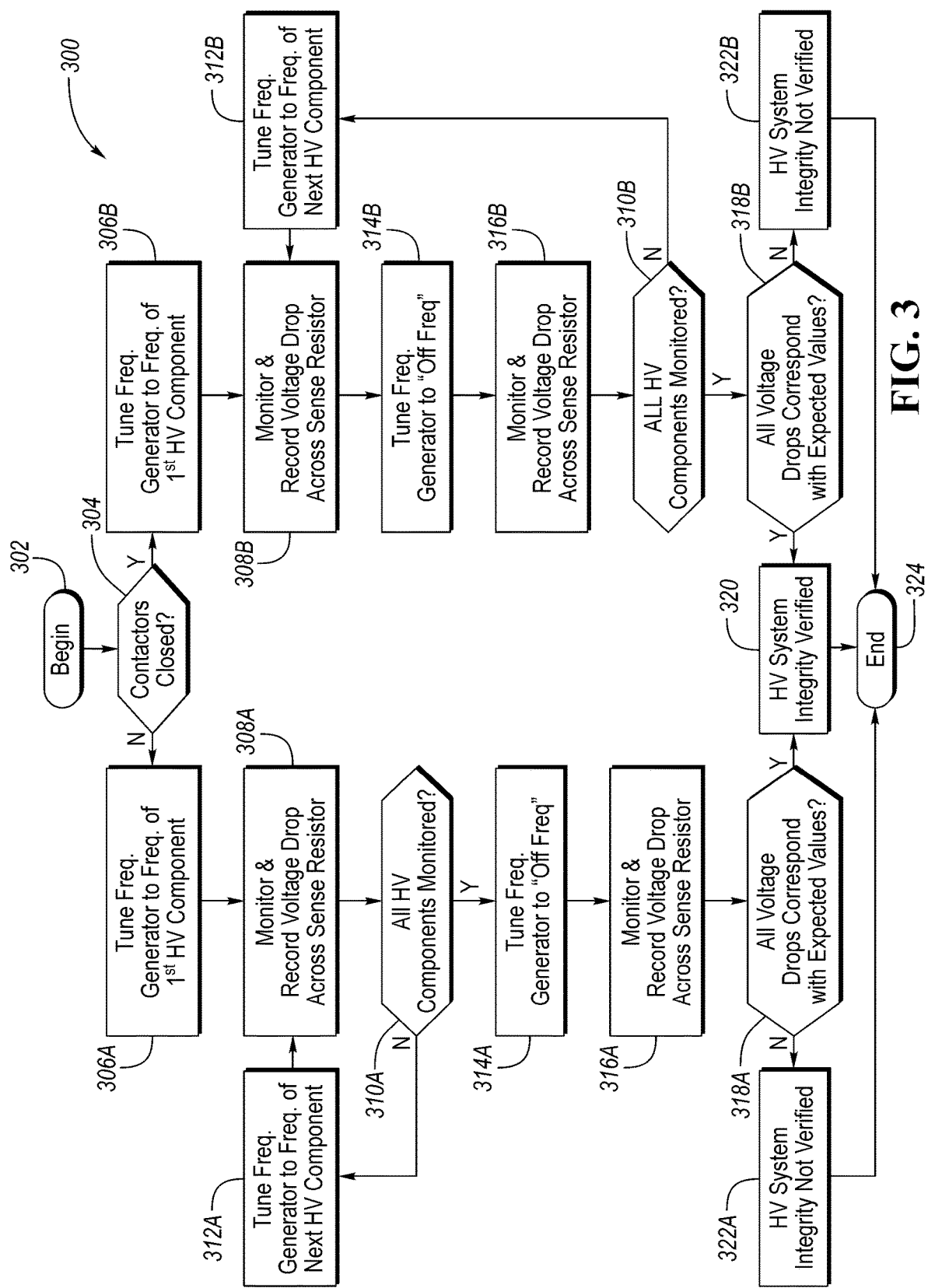
FIG. 3 is a flow diagram illustrating a tuned resonance high-voltage interlock of a high-voltage system.

FIG. 3 is a flow diagram illustrating a tuned resonance high-voltage interlock strategy 300 for a high-voltage system. This illustration is one implementation that may be implemented to have main control logic for the monitoring system located in the same module which has direct control over the HV contactors. In this illustration, the control logic would be operated in two distinct modes, 1) before initial contactor closure, and 2) continuously during HV system operation while contactors are closed.

Basically, the operation before initial contactor closure is such that the integrity of the HV system would be monitored before the contactors are closed for the first time. This should be done quickly to avoid delaying vehicle start-up. The control logic may be pre-programmed with the natural frequency of the tuned circuit in each HV component and the corresponding expected voltage drop across a sense resistor at each of these frequencies, or the control logic may be programmed during manufacturing to adjust for manufacturing tolerances. Ideally, the control logic would also be programmed with at least one additional frequency (a.k.a. "off frequency") which is a frequency that is intentionally chosen to NOT correspond with the natural frequency of any HV component along with the expected voltage drop across the sense resistor at this frequency. For example, if 1 MHz is the fundamental frequency, an "off frequency" may include 1.5 MHz. In this example, the use of 1.5 MHz does produce similar harmonics ($3^{rd}$ harmonic of fundamental equals $2^{nd}$ harmonic of "off frequency"), however other frequencies may be selected to reduce any overlap of fundamental or "off frequency" harmonics. The control logic may then quickly switch or "tune" the frequency generator to each of these frequencies and monitor the resultant voltage drop across the sense resistor. If all of the expected voltage drops were recorded for each frequency, then the integrity of the HV system would be verified, and the contactors would be allowed to close.

When the system is operated for continuous operation with HV contactors closed, the integrity of the HV system is monitored continuously during operation. The control logic would tune the frequency generator to the frequency of the 1st HV component and monitor the voltage drop across the sense resistor, as before. The control logic may be configured to remain at this frequency for a longer duration than before contactor closure, if necessary, to provide greater confidence in the measurement due to operational noise in the system (i.e. interaction with switching frequency harmonics, etc). The control logic may then tune to the "off frequency" and monitor for the expected voltage drop as an operational test. The control logic may continue on to the frequencies of the each subsequent HV component and monitor the respective voltage drops, tuning to the "off frequency" between each one. If all of the expected voltage drops were recorded for each frequency, then the integrity of the HV system would be verified, and the system would be allowed to continue to operate in a normal manner. The control logic would then continuously cycle through this pattern as long as the HV contactors remain closed.

In the tuned resonance high-voltage interlock strategy 300, the control logic checks the condition of the main contactors in operation 304. If the contactors are closed, the control logic branches to operation 306A. If the contactors are open, the control logic branches to operation 306B. In operation 306A, the control logic tunes the frequency generator to the fundamental frequency of the first HV component or module and proceeds to operation 308A. Similarly, in operation 306B, the control logic tunes the frequency generator to the fundamental frequency of the first HV component or module and proceeds to operation 308B.

In operation 308A, the control logic measures and records a voltage drop across the sense resistor. In operation 308A, a measurement is taken over a first period of time and in operation 308B, the control logic measures and records a voltage drop across the sense resistor over a second period of time less than the first period of time. As the main contactors are closed, the second period of time is selected such that the measurement may be made during operation, as such increased precision may desired, as for initially, the first period of time is selected to allow the vehicle to start up quickly.

After operation 308A, the control logic proceeds to 310A. In operation 310A, the control logic checks if all HV modules have not been tested. If all HV modules have not been tested, the control logic branches to operation 312A, at which the control logic tunes the frequency generator to the next frequency for the next HV module and proceeds to operation 308A. If all HV modules have been tested, the control logic branches to operation 314A.

In operation 314A, the control logic tunes the frequency generator to the "off frequency" and proceeds to operation 316A. In operation 316A, the control logic measures and records a voltage drop across the sense resistor. In operation 316A, a measurement may also be taken over a first period of time. After, the control logic proceeds to operation 318A.

In operation 318A, the control logic compares the voltage drops measured and recorded with reference values, if the voltage drops are within a predetermined limit of the reference values, the control logic branches to operation 320 and the vehicle operates normally. If the voltage drops exceed a predetermined limit of the reference values, the control logic branches to operation 322A and the vehicle enters into a fault mode. In operation 322A, the control logic, based on the difference between the voltage drop and the reference value may inhibit closing the main contactors.

Similarly, after operation 308B, the controller proceeds to operation 314B. In operation 314B, the control logic tunes the frequency generator to the "off frequency" and proceeds to operation 316B. In operation 316B, the control logic the control logic measures and records a voltage drop across the sense resistor. In operation 316B, a measurement may also be taken over a second period of time. After, the control logic proceeds to operation 310B.

In operation 310B, the control logic checks if all HV modules have not been tested, if all HV modules have not been tested, the control logic branches to operation 312B, at which the control logic tunes the frequency generator to the next frequency for the next HV module and proceeds to operation 308B. If all HV modules have been tested, the control logic branches to operation 318B.

In operation 318B, the control logic compares the voltage drops measured and recorded with reference values, if the voltage drops are within a predetermined limit of the reference values, the control logic branches to operation 320 and the vehicle operates normally. If the voltage drops exceed a predetermined limit of the reference values, the control logic branches to operation 322B and the vehicle enters into a fault mode. In operation 322B, the control logic, based on the difference between the voltage drop and the reference value may inhibit closing the main contactors.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A high-voltage system for a vehicle comprising:
a module having a resonant circuit coupled across powerlines;
a controller programmed to, during a power up of the high-voltage system, propagate on the powerlines a first signal at a fundamental frequency for a first period, and in response to a first impedance measured across the powerlines at the fundamental frequency during the period being less than a predetermined value, close main contactors to energize the module, wherein the controller is further programmed to propagate a second signal at an offset frequency for a second time period, after the first period, on the powerlines, and in response to a second impedance measured across the powerlines at the offset frequency during the second time period being less than the predetermined value, open the main contactors to de-energize the module.

2. The high-voltage system of claim 1, wherein the offset frequency is proportional to the fundamental frequency.

3. The high-voltage system of claim 2, wherein the offset frequency is greater than 4 times the fundamental frequency.

4. The high-voltage system of claim 1 further comprising a second module having a second resonant circuit coupled across powerlines in parallel with the module, and wherein the controller is further programmed to propagate a third signal at a second offset frequency for a third time period, on the powerlines, and in response to a third impedance measured across the powerlines at the second offset frequency during the third time period exceeding the predetermined value, open the main contactors to de-energize the module.

5. The high-voltage system of claim 4, wherein the second offset frequency is selected such that a first 3 fundamental frequency harmonics are distinct from a first 3 second offset frequency harmonics.

6. The high-voltage system of claim 1, wherein the signal is a sinusoidal signal or a PWM signal.

7. The high-voltage system of claim 1, wherein the fundamental frequency is based on a tuned resonate circuit having an inductance and capacitance substantially tuned to the fundamental frequency.

8. A method of interlocking a high-voltage system of a vehicle comprising:
propagating a resonant frequency, of an LC circuit in the system, on powerlines of the system during a first period;
measuring an impedance across the powerlines during the first period;
in response to the impedance being within a predetermined range of a reference value, energizing the high-voltage system;
propagating an offset frequency on the powerlines during a second period after the first period;
measuring a second impedance across the powerlines during the second period; and
in response to the second impedance being less than a maximum of the predetermined range, de-energizing the high-voltage system.

9. The method of claim 8, wherein the offset frequency is a product of a coefficient and the resonant frequency, wherein the coefficient is an odd prime number.

10. The method of claim 8, wherein the offset frequency is a product of a coefficient and the resonant frequency, wherein the coefficient is a decimal number having a fractional part that is an odd prime number.

11. A high-voltage system for a vehicle comprising:
a module having a resonant circuit coupled across powerlines;
a second module having a second resonant circuit coupled across powerlines in parallel with the first module; and
a controller programmed to,
during a power up of the high-voltage system, propagate on the powerlines a first signal at a fundamental frequency for a first period, and in response to a first impedance measured across the powerlines at the fundamental frequency during the period being less than a predetermined value, close main contactors to energize the module, and
propagate a second signal at a second offset frequency for a second time period, on the powerlines, and in response to a second impedance measured across the powerlines at the second offset frequency during the second time period exceeding the predetermined value, open the main contactors to de-energize the module.

12. The high-voltage system of claim 11, wherein the second offset frequency is selected such that a first 3 fundamental frequency harmonics are distinct from a first 3 second offset frequency harmonics.

13. The high-voltage system of claim 11, wherein the signal is a sinusoidal signal or a PWM signal.

14. The high-voltage system of claim 11, wherein the fundamental frequency is based on a tuned resonate circuit having an inductance and capacitance substantially tuned to the fundamental frequency.

* * * * *